United States Patent
Brown et al.

(10) Patent No.: US 9,448,705 B2
(45) Date of Patent: Sep. 20, 2016

(54) CONFIGURING GRAPHICAL DISPLAYS

(75) Inventors: Troy L. Brown, Westminster, CO (US);
Kevin W. Chapman, Arvada, CO (US);
Gary Dean Lantaff, Westminster, CO
(US); Kaj Toivonen, Westminster, CO
(US)

(73) Assignee: Trimble Navigation Limited,
Sunnyvale, CA (US)

( * ) Notice: Subject to any disclaimer, the term of this patent is extended or adjusted under 35 U.S.C. 154(b) by 1316 days.

(21) Appl. No.: 12/005,978

(22) Filed: Dec. 28, 2007

(65) Prior Publication Data

US 2009/0172589 A1 Jul. 2, 2009

Related U.S. Application Data

(60) Provisional application No. 61/002,086, filed on Nov. 5, 2007.

(51) Int. Cl.
*G06F 3/0484* (2013.01)

(52) U.S. Cl.
CPC .................. *G06F 3/04845* (2013.01)

(58) Field of Classification Search
CPC ................................... G06F 3/04845
USPC ....................... 715/964, 787, 853
See application file for complete search history.

(56) References Cited

U.S. PATENT DOCUMENTS

| | | | | |
|---|---|---|---|---|
| 6,606,105 | B1* | 8/2003 | Quartetti | G06F 3/0481 715/203 |
| 6,853,390 | B1* | 2/2005 | Wandersleben | G06F 3/0481 715/802 |
| 7,576,752 | B1* | 8/2009 | Benson | G06F 3/1415 345/619 |
| 7,814,110 | B2* | 10/2010 | Anelle | G06F 17/30398 707/754 |
| 7,825,940 | B1* | 11/2010 | Vieilly | G06T 19/20 345/419 |
| 2005/0289109 | A1* | 12/2005 | Arrouye | G06F 17/301 |
| 2006/0274070 | A1* | 12/2006 | Herman | A63F 13/10 345/474 |
| 2008/0033919 | A1* | 2/2008 | Arrouye | G06F 17/30997 |
| 2008/0195930 | A1* | 8/2008 | Tolle | G06F 17/30994 715/227 |

OTHER PUBLICATIONS

Adobe Creative Team, "Adobe Illustrator CS2 Classroom in a Book", Jun. 17, 2005, Adobe Press, p. 41-49 and 208-229.*

* cited by examiner

*Primary Examiner* — Reza Nabi
(74) *Attorney, Agent, or Firm* — Kilpatrick Townsend & Stockton LLP

(57) ABSTRACT

A view filter manager (VFM) is provided. The VFM comprises a view filter configured to format a display of a computer-implemented graphical representation comprising a plurality of layers of related data. The VFM further comprises a scrollable listing of the plurality of layers, and a layer isolate function configured to flag a selected layer in the scrollable listing in response to a layer selection, and store the layer selection while the scrollable listing is subsequently scrolled.

17 Claims, 9 Drawing Sheets

700

Utilize a View Filter to Display a Graphical Label in a Portion of a Graphical Display of a CAD Program
710

Collapse the Graphical Label in Response to a Selection such that the Graphical Label Occupies Less Space in the Graphical Display
720

Generate a New Configuration of the View Filter in Response to the Collapsing
730

┌─────────────────────────────────────────────┐
│ Provide a Scrollable Listing of Multiple Layers of Related │
│ Data Associated with a Graphical Representation │
│ Displayed in a GUI by a View Filter │
│ 810 │
└─────────────────────────────────────────────┘
                         ↓
┌─────────────────────────────────────────────┐
│ Receive a Layer Selection during a Scrolling of the │
│ Scrollable Listing, wherein the Layer Selection │
│ Identifies a Layer of Related Data from among │
│ the Multiple Layers of Related Data │
│ 820 │
└─────────────────────────────────────────────┘
                         ↓
┌─────────────────────────────────────────────┐
│ Store the Layer Selection while the Scrolling of │
│ the Scrollable Listing is Continued │
│ 830 │
└─────────────────────────────────────────────┘
                         ↓
┌─────────────────────────────────────────────┐
│ Edit the View Filter based on the Layer Selection │
│ 840 │
└─────────────────────────────────────────────┘

Enable a User-Defined View Filter to be Created, wherein the User-Defined View Filter is Configured to Display Information in a CAD Program
910

Implement a Locking Function in Response to Receiving a Locking Input wherein the Locking Function is Configured to Lock the User-Defined View Filter such that the User-Defined View Filter is Unalterable during an Operation of the User-Defined View Filter
920

FIG. 9

CONFIGURING GRAPHICAL DISPLAYS

RELATED U.S. APPLICATION (PROVISIONAL)

This non-provisional application claims priority to the provisional patent application, Ser. No. 61/002,086, entitled "CONFIGURING GRAPHICAL DISPLAYS," with filing date Nov. 5, 2007, and assigned to the assignee of the present invention, which is herein incorporated by reference in its entirety.

TECHNICAL FIELD

The technology relates to the field of graphical displays, and related endeavors.

BACKGROUND

Graphical displays are generally used to provide information in a graphical format that can be visually analyzed. Various formats exist for representing data in a graphical display. Pictures, graphs and charts are some of the formats typically used for illustrating information in the form of a visual representation. Moreover, due to the relatively quick processing speed of modern computing systems, computer-implemented graphical displays are often used to represent data in a graphical user interface (GUI).

Computer-aided design (CAD) systems generally comprise applications for creating or representing objects in two or three dimensions, wherein the graphically represented objects are capable of being changed or edited. Certain CAD applications are capable of representing an object in the form of a wire frame "skeleton," while others are capable of displaying an object using shaded surfaces. Due to the various tools available in many modern CAD systems, such systems are being increasingly used in many graphical design applications.

SUMMARY

This Summary is provided to introduce a selection of concepts that are further described below in the Detailed Description. This Summary is not intended to identify key or essential features of the claimed subject matter, nor is it intended to be used as an aid in determining the scope of the claimed subject matter.

A view filter manager (VFM) is provided. The VFM comprises a view filter configured to format a display of a computer-implemented graphical representation comprising a plurality of layers of related data. The VFM further comprises a scrollable listing of the plurality of layers, and a layer isolate function configured to flag a selected layer in the scrollable listing in response to a layer selection, and store the layer selection while the scrollable listing is subsequently scrolled.

DESCRIPTION OF THE DRAWINGS

The accompanying drawings, which are incorporated in and form a part of this specification, illustrate embodiments of the technology for configuring graphical displays, and together with the description, serve to explain principles discussed below:

FIG. 7 is a flowchart of an exemplary method of configuring a graphical display of a CAD program used in accordance with an embodiment.

FIG. 8 is a flowchart of an exemplary method of filtering data related to a graphical representation displayed in a GUI by a view filter used in accordance with an embodiment.

FIG. 9 is a flowchart of an exemplary method of configuring a CAD program used in accordance with an embodiment.

The drawings referred to in this description should be understood as not being drawn to scale except if specifically noted.

DETAILED DESCRIPTION

Reference will now be made in detail to embodiments of the present technology for configuring graphical displays, examples of which are illustrated in the accompanying drawings. While the technology for configuring graphical displays will be described in conjunction with various embodiments, it will be understood that they are not intended to limit the present technology for configuring graphical displays to these embodiments. On the contrary, the presented technology for configuring graphical displays is intended to cover alternatives, modifications and equivalents, which may be included within the spirit and scope of the various embodiments as defined by the appended claims.

Furthermore, in the following detailed description, numerous specific details are set forth in order to provide a thorough understanding of the present technology for configuring graphical displays. However, the present technology for configuring graphical displays may be practiced without these specific details. In other instances, well known methods, procedures, components, and circuits have not been described in detail so as not to unnecessarily obscure aspects of the presented embodiments.

Example Computer System Environment

Figure 1:
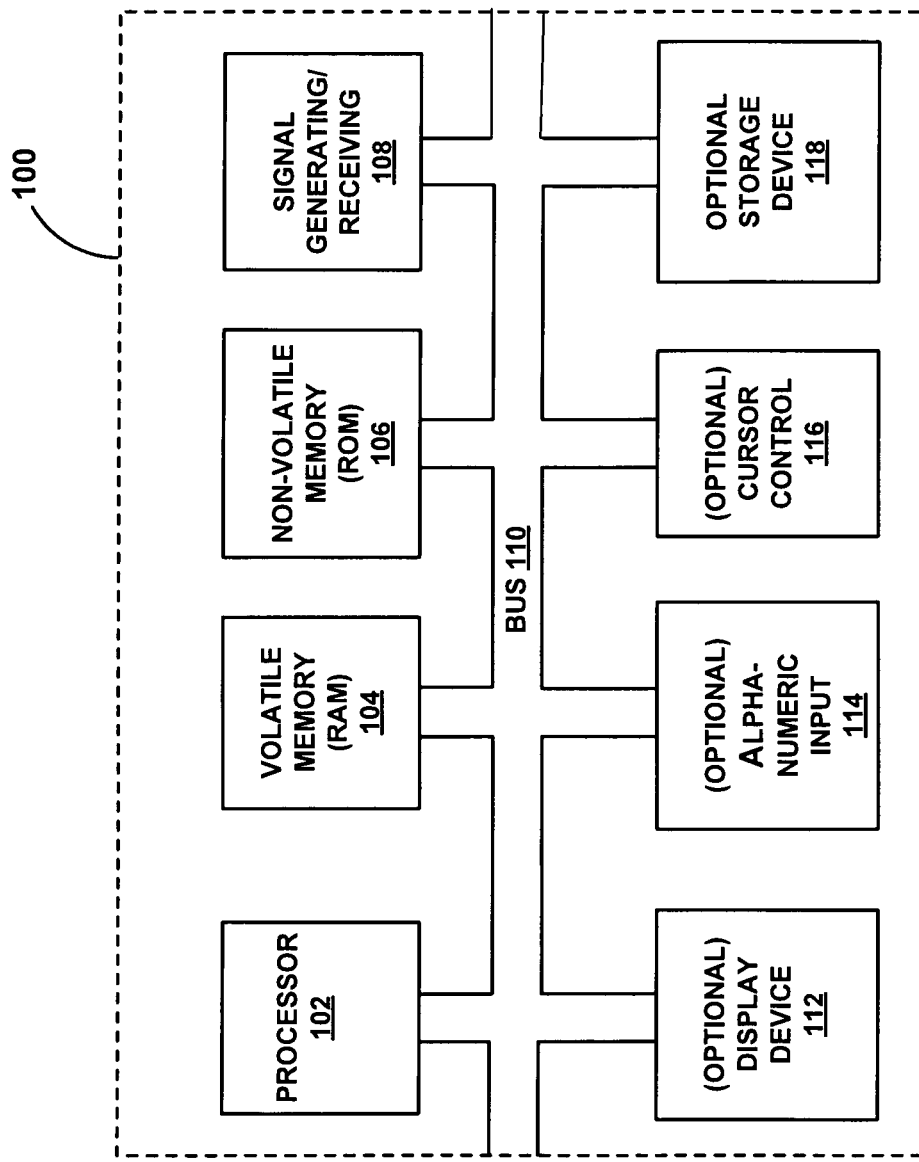
FIG. 1 is a block diagram of an exemplary computer system used in accordance with an embodiment.

With reference now to FIG. 1, a block diagram of a computer system 100 according to an embodiment is shown. It is appreciated that computer system 100 is not strictly limited to being a computer system, and that computer system 100 may be used in accordance with various embodiments described herein. As such, computer system 100 of the present embodiment may be well suited to be any type of computing device (e.g., a computing device utilized to perform calculations, processes, operations, and functions associated with a CAD program, such as CAD program 210 of FIG. 2). Within the discussions herein, certain processes and steps are discussed that are realized, in one embodiment, as a series of instructions (e.g., software program) that reside within computer readable memory units and are executed by a processor(s) of computer system 100. When executed, the instructions cause computer system 100 to perform specific actions and exhibit specific behavior that may be described in detail herein.

Computer system 100 of FIG. 1 comprises an address/data bus 110 for communicating information, one or more central processors 102 coupled with bus 110 for processing information and instructions. Central processor unit(s) 102 may be a microprocessor or any other type of processor. Computer system 100 also includes data storage features such as a computer usable volatile memory unit 104 (e.g., random access memory, static RAM, dynamic RAM, etc.) coupled with bus 110 for storing information and instructions for central processor(s) 102, a computer usable non-volatile memory unit 106 (e.g., read only memory, programmable ROM, flash memory, EPROM, EEPROM, etc.) coupled with bus 110 for storing static information and instructions for processor(s) 102. Computer system 100 also includes one or more signal generating and receiving devices 108 coupled with bus 110 for enabling computer system 100 to interface with other electronic devices and computer systems. The communication interface(s) 108 of the present embodiment may include wired (e.g., serial cables, modems, and network adaptors) and/or wireless (e.g., wireless modems and wireless network adaptors) communication technology.

Optionally, computer system 100 may include an alphanumeric input device 114 including alphanumeric and function keys coupled to the bus 110 for communicating information and command selections to the central processor(s) 102. Computer system 100 can include an optional cursor control or cursor directing device 116 coupled to the bus 110 for communicating user input information and command selections to the central processor(s) 102. The cursor-directing device 116 may be implemented using a number of well-known devices such as a mouse, a track-ball, a track-pad, an optical tracking device, and a touch screen, among others. Alternatively, it is appreciated that a cursor may be directed and/or activated via input from the alphanumeric input device 114 using special keys and key sequence commands. The present embodiment is also well suited to directing a cursor by other means such as, for example, voice commands.

Computer system 100 of FIG. 1 may also include one or more optional computer usable data storage devices 118 such as a magnetic or optical disk and disk drive (e.g., hard drive, floppy diskette, Compact Disk-Read Only Memory (CD-ROM), Digital Versatile Disk (DVD)) coupled with bus 110 for storing information and/or computer executable instructions. An optional display device 112 may be coupled to bus 110 of computer system 100 for displaying video and/or graphics. It should be appreciated that optional display device 112 may be a cathode ray tube (CRT), flat panel liquid crystal display (LCD), field emission display (FED), plasma display or any other display device suitable for displaying video and/or graphic images and alphanumeric characters recognizable to a user.

View Filter Overview

Computer-aided design (CAD) systems are generally used to design, develop and/or analyze various physical objects, plans or layouts using graphical representations of one or more physical objects, wherein such graphical representations are generated by utilizing a computer system, such as computer system 100. CAD applications include, but are not limited to, two-dimensional or three-dimensional drawing programs, slideshow applications, or any other computer implemented tools capable of generating, illustrating or implementing computer-aided designs. Certain CAD applications are capable of representing an object in the form of a wire frame "skeleton," while others are capable of displaying an object using shaded surfaces. In addition, various CAD applications are often used during engineering processes involving, for example, the conceptual design and layout of products as well as the dynamic analysis of component assemblies.

Many CAD systems are utilized to visually design data structures or display a graphical representation of a data structure using a graphical user interface (GUI). CAD systems generally comprise applications for creating or representing objects in two or three dimensions, wherein the graphically represented objects are capable of being changed or edited. For instance, in one example, a graphical representation of a building is displayed in a CAD program such that a user is presented with the option of analyzing and/or changing various attributes of the building.

Due to the relative complexity of many data structures, a data structure according to one embodiment comprises many layers of related data, and these layers of related data are used to construct a graphical representation of the data structure. To illustrate, a building is generally characterized as having various physical attributes, such as piping and electrical wiring. Therefore, in one example, a graphical representation of a building in a CAD program comprises multiple layers of related data, such as a piping layer and an electrical wiring layer. Moreover, this graphical representation is constructed by first defining the various layers of the building, and then aggregating these data layers in a viewing region associated with the CAD program.

Figure 2:
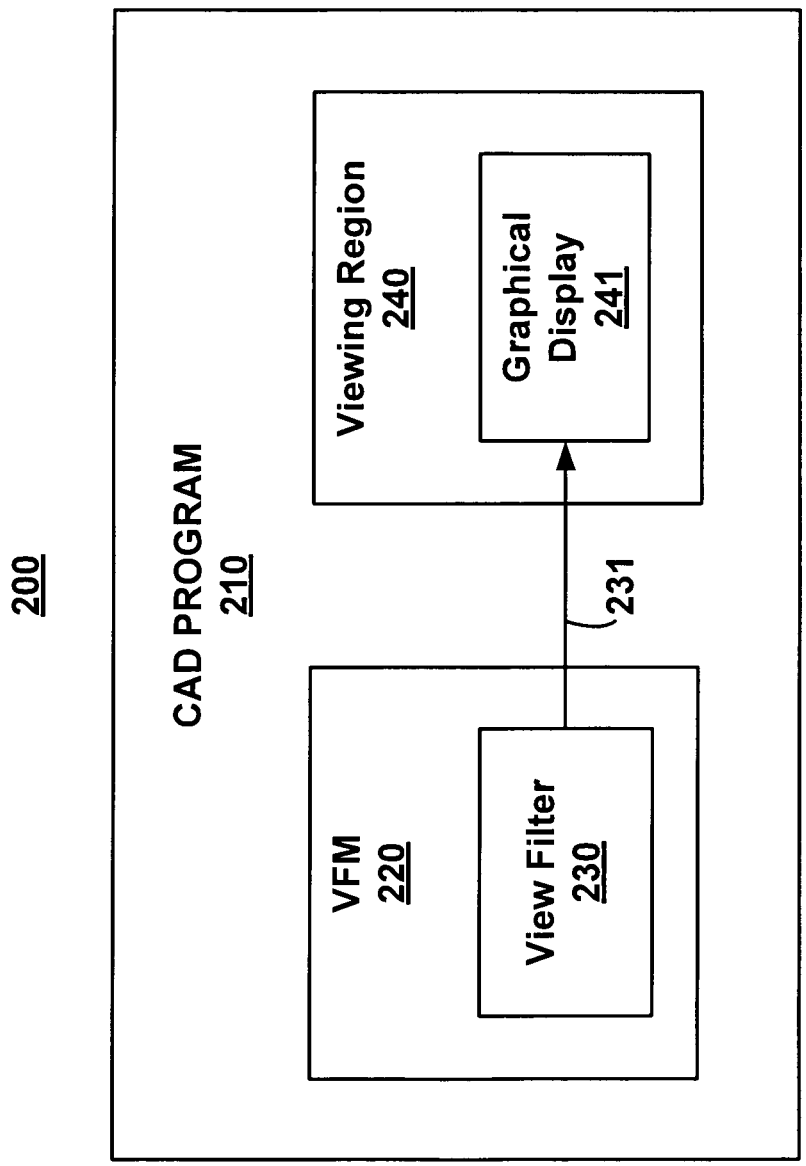
FIG. 2 is a block diagram of an exemplary data processing configuration used in accordance with an embodiment.

Oftentimes when using a CAD program to design data structures or display a group of data, a user will control which data is displayed in a graphical view in a GUI by specifying a viewing criterion. In one embodiment, such a viewing criterion, when aggregated with other requisite displaying criteria, comprises a view filter that is used to display data in the GUI by filtering out irrelevant data. With reference now to FIG. 2, an exemplary data processing configuration 200 according to an embodiment is shown. Data processing configuration 200 comprises a CAD program 210 that is used to generate a graphical display 241. CAD program 210 utilizes a view filter 230 to filter data that is accessed by or on behalf of CAD program 210 and display 231 graphical display 241 in a viewing region 240 associated with CAD program 210.

It is understood that, pursuant to an embodiment, view filter 230 is used to display data that is relevant and useful to the user. For instance, in one example, a graphical representation of a building is displayed in CAD program 210 and view filter 230 is configured to filter a layer of related data, such as a layer comprising information relating to the electrical wiring in the building, from one or more other layers of related data, such as a piping layer. In this manner, a user is presented with the option of easily and efficiently analyzing information associated with one or more layers of interest by filtering out data that is irrelevant to the user.

It is further understood, however, that in certain circumstances, functional efficiency of a view filter is achieved when the view filter has realized various operational objectives. For instance, in one example, a user desires the ability to create view filters quickly and configure the appearance of these view filters so that irrelevant criteria that the user infrequently or never utilizes does not take up precious space in the GUI. Thus, in-accordance with an embodiment, a view filter is configurable so as to display criteria of interest to a user while excluding other criteria from view.

In a different embodiment, a view filter is configured to restrict a view in a GUI to objects belonging to pre-defined or user-defined data collections. For instance, in one example, multiple objects are members of the same data collection, and a view filter is configured to display these objects in a GUI while excluding from view objects not associated with this collection. In an alternative embodiment, objects are imported from a certain file, and these objects are displayed in a GUI by a view filter, while the view filter simultaneously excludes from view data that has not been obtained from the same file.

It is therefore understood that, in accordance with an embodiment, a view filter is configurable so as to exclude certain data from view in a GUI while other data is shown to a user. However, it is also appreciated that an incredible amount of data may be associated with relatively complex data structures, such as a data structure comprising hundreds of layers of data, but a user may only be interested in one or more specific data layers from among the total number of associated data layers. Therefore, in accordance with an embodiment, a user determines which of these layers are to be visible, and which are to be hidden from view, such that an accurate and effective analysis of the information is capable of being efficiently performed, and a view filter is configured accordingly.

It is further understood that a user may expend a significant amount of time and effort when creating and configuring a view filter, especially when the view filter comprises hundreds of layers of data. Reconfiguring a view filter in accordance to a previously defined configuration may be time-consuming, depending on the amount of customization involved. Thus, in one embodiment, a configuration of a view filter may be saved into a system memory and then subsequently accessed and implemented by a user. In this manner, a user has the option of re-using a previously created view filter such that the user is not forced to subsequently reconfigure a new view filter according to a prior view filter configuration.

View Filter Manager

An embodiment consolidates many functions useful for filtering and displaying data in a GUI into a single view filter manager (VFM). With reference still to FIG. 2, data processing configuration 200 further comprises a VFM 220 that manages view filter 230. In one example, VFM 220 is configured to allow users to create, modify and rename view filters such that the users can re-use those view filters that they have previously created, as well as delete those view filters that are no longer of interest to the user.

VFM 220 also allows a user to configure a view filter, such as view filter 230, to show criteria of interest to the user and hide from view other criteria that are seldom used. In one embodiment, view filter 220 is designed to show certain layers of data, and criteria associated with these layers, in viewing region 240 while excluding criteria not associated with these layers. Therefore, in one example, a user saves time when the user is searching for a specific criterion of interest because the criteria that are not of interest to the user are not displayed in the GUI utilized by CAD program 210.

VFM 220 is further configured, in accordance with an embodiment, such that clicking a graphical checkbox shown in a GUI turns a viewing criterion on or off. In one example, CAD program 210 includes such a graphical checkbox, and a user clicks the graphical checkbox by means of an input device, such as a mouse. In this manner, checking the graphical checkbox causes VFM 220 to automatically apply a user's input without waiting for a subsequent response from the user.

VFM 220 is further configured, in accordance with an alternative embodiment, to allow a user to specify those objects or items that the user wishes to be visible, and create a collection of objects that comprises the selected items. It is understood, however, that a collection may be created automatically by VFM 220, such as when objects are imported from another file, or the collection may be a user-defined collection or selection set.

In one embodiment, VFM 220 is integrated with a layer isolation feature that allows a user to view a single layer of data and configure view filter 220 to either show this layer or exclude it from a graphical representation displayed by view filter 220 in viewing region 240. In this manner, a user has the option of quickly creating a view filter, such as view filter 230, which is configured to show those layers that are important to the user while simultaneously excluding other layers of data.

It is appreciated that an alternative to such an integrated layer isolation feature would be for a user to manually toggle layers on and off one at a time, write down or record the interesting layers, and then return to turn all of the interesting layers back on. This manual procedure could be slow and error-prone, and might not offer time or effort savings when repeating the procedure. In contrast, integrated layer isolation streamlines the layer review process and allows a user to review a view filter without corrupting it.

VFM 220 is configured, in accordance with an embodiment, to allow a user to lock view filter 230 such that view filter 230 cannot be altered or edited when view filter 230 is in use. For instance, in one example, view filter 230 is generated, wherein the creation and customization of view filter 230 is the product of a person's time and toils, and locking view filter 230 causes view filter 230 to be protected against accidental modification. It is appreciated that due to the potentially substantial amount of time that users may invest when creating and configuring a view filter, the present embodiment provides a potentially valuable feature that allows users to protect the fruit of their labors. Moreover, the present embodiment offers potentially significant time-savings to a user because an accidental modification of a customized view filter configuration could cause the user to expend more time and effort in order to reconfigure the view filter so as to undo the effects of the modification.

In one embodiment, attempting to edit a locked view filter will cause an editable copy to be automatically created such that the locked view filter is protected from modification, but wherein a user is presented with the option of altering the editable copy of the locked view filter. In this manner, attempting to change a locked view filter does not compromise security associated with the protected configuration of the view filter. Instead, the locked view filter is protected from modification, but a replica of the view filter is created that is capable of being altered by the user.

It is therefore understood that, pursuant to various embodiments disclosed herein, the individual functions and capabilities of VFM 220 would be extremely beneficial to a user. Moreover, the integration of these functions into a single view filter manager, such as VFM 220, could be used to provide relatively powerful graphical design and analysis tool in CAD applications.

Figure 3:
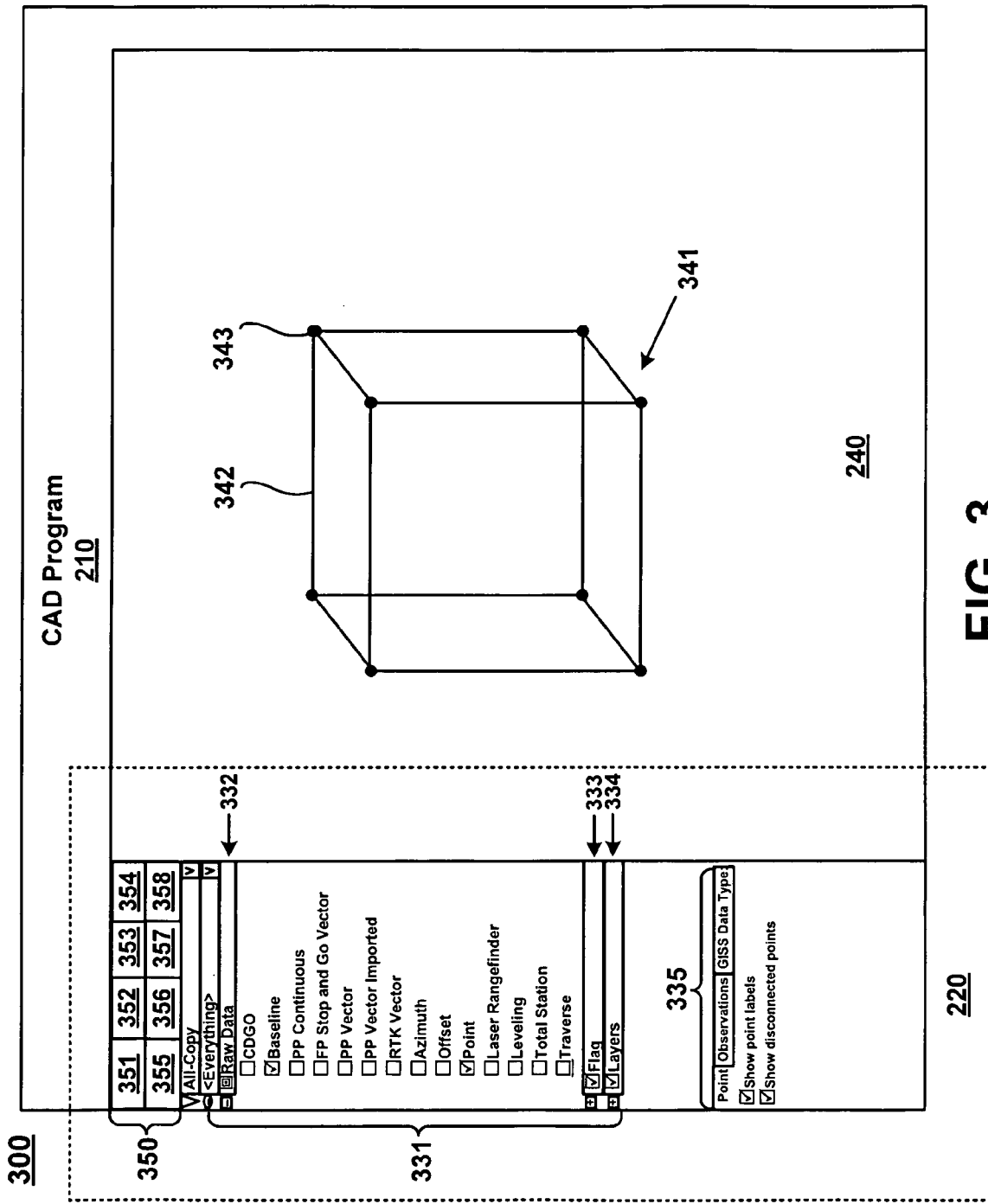
FIG. 3 is a diagram of an exemplary display configuration used in accordance with an embodiment.

With reference now to FIG. 3, an exemplary display configuration 300 for displaying data in CAD program 210 in accordance with an embodiment is shown. A graphical representation 341 of a data structure is displayed in viewing region 240. Graphical representation 341 includes a group of vectors 342 and vertices 343, wherein vectors 342 are connected to one another by means of the displayed vertices 343. It is understood that the presentation of vectors 342 and vertices 343 in viewing region 240 allows a user to visually analyze attributes of the graphically represented data structure, by means of an implemented GUI.

Graphical representation 341 is displayed in viewing region 240 using a view filter, such as view filter 230, which is used to format or filter data associated with a data structure such that a selected set of data is displayed in viewing region 240 while other information is excluded from view. In one embodiment, a data structure comprises a plurality of layers of related data, and view filter 230 is configured to display one or more specific layers from this plurality of layers in viewing region 240. In this manner, specific data of interest can be displayed in CAD program 210 while other information is suppressed from view. It is appreciated that such a configuration allows a user to better concentrate on specific data of interest because, for example, data that is not of interest to the user will not be presented in the implemented GUI.

With reference still to FIG. 3, the display configuration 300 further comprises a view filter manager, such as VFM 220, which is used to configure one or more view filters associated with CAD program 210. Pursuant to an exemplary embodiment, a graphical dialog module, which is docked or floated in a GUI, is included in CAD program 210 so as to display a graphical interface of VFM 220 to a user, as shown in FIG. 3. This implementation allows a user to save time when attempting to make a change in the GUI, since the availability of the information in the graphical dialog module is continuous. For the sake of brevity and clarity, however, it is understood that as described herein, VFM 220 may refer to such a graphical interface as well as to a non-visual VFM module that is represented in such graphical interface.

With reference still to FIG. 3, VFM 220 includes a number of graphical buttons 350 that a user has the option of selecting, such as with a keyboard or mouse, wherein each of these graphical buttons 350 is used to execute a function by VFM 220. Graphical buttons 350 include a copy button 351, the execution of which causes a file or set of data to be copied into a temporary memory module. The set of graphical buttons 350 also comprises a paste button 352, which is configured to paste data stored in the temporary memory module into a portion of CAD program 210. A delete button 353 is also included in VFM 220, wherein delete button 353 allows users to delete items from viewing region 240 by first selecting an item to be deleted from view and then clicking delete button 353. VFM 220 further includes automatic zoom, layer isolate, layer exclude, advanced view filter settings and view filter locking buttons 354-358, discussed herein.

Listings of attributes 331 associated with a data structure are included in VFM 220, in accordance with an embodiment, such that a user can select, such as by selecting a graphical checkbox, attributes that are to be displayed in viewing region 240 by a particular view filter, as well as suppress information that is not of interest to the user, such as by un-checking a graphical checkbox. For instance, as shown in FIG. 3, the "Point" attribute has been selected by checking a box next to the "Point" label in VFM 220. As a result, the edited view filter will display the "Point" data associated with the graphically represented data structure in viewing region 240. In FIG. 3, this point data is displayed as vertices 343.

With reference still to FIG. 3, the "Baseline" attribute has similarly been turned on by checking a box in VFM 220 located next to the "Baseline" label. Consequently, the edited view filter displays the "Baseline" data in the viewing region 240 of CAD program 210, wherein this data is illustrated as vectors 342 that couple with one another at vertices 343.

In one embodiment, VFM 220 utilizes one or more drop-down menus for displaying categories of data attributes. For example, VFM 220 of FIG. 1 includes a "Raw Data" drop-down menu 332 that has been expanded in a view of VFM 220 such that one of the listings of attributes 331 is displayed. VFM 220 further comprises a "Flag" drop-down menu 333 configured to list flag attributes, and a "Layers" drop-down menu 334 configured to list different layers of related data. Such a configuration of VFM 220 allows data to be organized in VFM 220 in order to aid a user who is searching for a specific data attribute.

VFM 220 further comprises, pursuant to an embodiment, one or more graphical tabs used to embed further information in VFM 220. For instance, VFM 220 of FIG. 1 includes a set of graphical tabs 335, which are labeled "Point", "Observations" and "GNSS Data Types". Each of these tabs corresponds to an embedded menu that is hidden from view when a different graphical tab has been selected. In this manner, when the "Point" tab is selected, as shown in FIG. 1, the "Observation" and "GNSS Data Types" menus are hidden from view.

It is therefore understood that, pursuant to an exemplary embodiment, a set of embedded menus is utilized to include various options in VFM 220 such that one or more of these menus are hidden from view so as to conserve space in a GUI. It is further understood that, in accordance with an embodiment, user options that are infrequently utilized are embedded in such menus such that these options are still available to a user, but wherein the majority of the space in VFM 220 is dedicated to displaying information that is more frequently utilized.

View Filter Creation and Editing

An approach to creating a new view filter using VFM 220 will now be discussed. It is understood, however, that the present technology is not limited to any one method of view filter creation. Indeed, the spirit and scope of the present technology allows view filters to be created in various ways.

Figure 4:
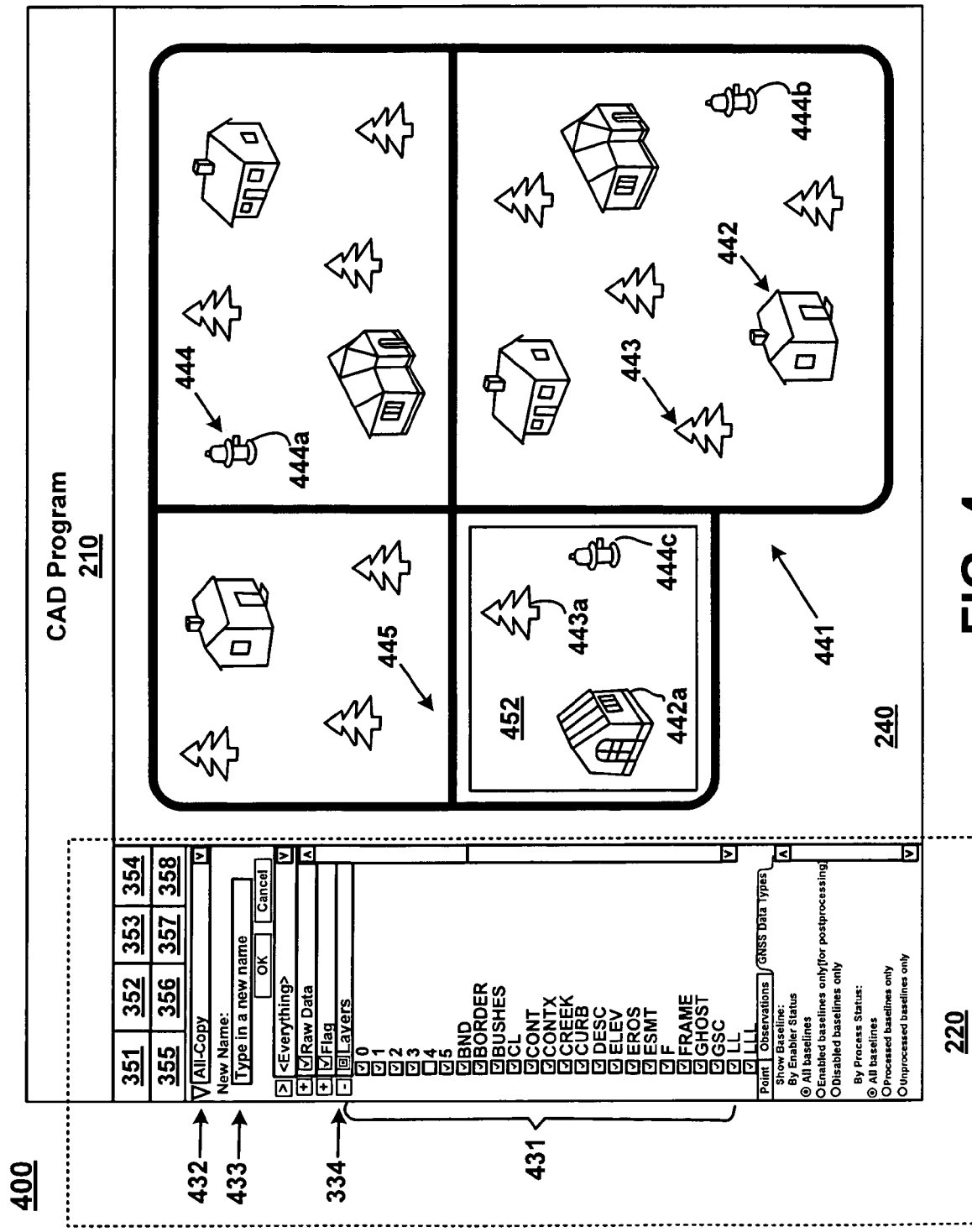
FIG. 4 is a diagram of an exemplary editing configuration used in accordance with an embodiment.

With reference now to FIG. 4, an exemplary editing configuration 400 for creating a new view filter in CAD program 210 in accordance with an embodiment is shown. As shown in VFM 220, the "Layers" drop-down menu 334 has been expanded such that multiple data layers 431 are listed in VFM 220. A user can then reference layers from among the multiple data layers 431 in the "Layers" drop-down menu 334 to configure a view filter, such as view filter 230, to display certain layers of related data while simultaneously hiding other layers from view. For instance, in the embodiment shown in FIG. 4, layers 0, 1, 2, 3 and 5 have been turned on, while layer 4 has been turned off. It follows that the edited view filter will display layers 0, 1, 2, 3 and 5 in viewing region 240, but will not display layer 4.

It is understood, however, that the present technology is not limited to the use of drop-down menus for displaying information to a user in a GUI. For instance, in one example, a set of graphically represented tabs are used to communicate to a user through a GUI which data layers associated with a graphically represented object shown in viewing region 240 are presently displayed in the GUI. Therefore, it is appreciated that various methods exist for configuring CAD program 210, and VFM 220, so as to communicate information to a user, and that the spirit and scope of the present technology is not limited to any one communication method.

In one embodiment, a default view filter is used by VFM 220 for displaying information in viewing region 240. This default view filter is unalterable such that the default settings of this view filter are not editable by a user. Rather, a user has the option of using the default view filter in its unaltered state, or instead creating a new view filter that is customizable according to a new display criterion.

With reference still to FIG. 4, CAD program 210 includes a default view filter labeled as "All". The "All" view filter can be selected by a user in a view filter selection drop-down menu 432, located in VFM 220. It is understood that view filter selection-drop-down menu 432 allows a user to switch between multiple view filters when more than one view filter is available.

VFM 220 also offers a manual and automatic copy function that allows a user to create an editable copy of the "All" view filter. For example, executing the copy function on the "All" view filter causes VFM 220 to create a new view filter called "All-Copy", which has the same configuration as the "All" view filter, but wherein the configuration of the "All-Copy" view filter is alterable.

In one embodiment, the name "All-Copy" is changed by VFM 220 to a different name that is input by a user in a text field 433 located in VFM 220. For example, VFM 220 in FIG. 2 includes a text field 433 labeled "New name:" in which the user is prompted to "Type in a new name" for the newly created view filter. Once the user has typed in a new name for this view filter, the user has the option of pressing an "OK" button to rename the view filter, or a "Cancel" button to exit the renaming application.

In accordance with an embodiment, the "All" view filter is unalterable, but an attempted alteration of the "All" view filter will cause the VFM 220 to automatically create a new view filter having an editable configuration. In one example, the "All" view filter is used to display data in viewing region 240, and upon a user attempting to change a configuration of the "All" view filter, VFM 220 automatically executes the copy function to create an editable view filter, wherein the user has the option of reconfiguring the editable view filter.

It is therefore understood that VFM 220 may be configured to create and edit one or more view filters in different ways. In an exemplary implementation, VFM 220 utilizes a view filter to display a first graphical label in a portion of a graphical display associated with CAD program 210, and collapses the first graphical label in response to a selection such that the first graphical label occupies less space in the graphical display. In one example, this graphical label is collapsed because it is of little importance to a user.

In an embodiment, VFM 220 further configures a view filter to display a second graphical label in the graphical display associated with CAD program 210 in response to the collapsing of the first graphical label. In this manner, graphical labels that are of greater importance to the user are displayed in a GUI while space in the GUI is simultaneously conserved by excluding from view information of less importance.

To further illustrate, in the embodiment shown in FIG. 4, "Layers" drop-down menu 334 has been expanded in VFM 220 whereas the "Raw Data" and "Flag" drop-down menus have been collapsed. Thus, in one example, the "Raw Data" and "Flag" drop-down menus are identified as being of little importance to a user, yet the "Raw Data" and "Flag" drop-down menus continue to occupy space in VFM 220. The "Raw Data" and "Flag" drop-down menus are consequently collapsed so that additional space in VFM 220 is allocated for tools or items that are more important to the user. In this manner, VFM 220 is customized such that space in VFM 220 is efficiently allocated to items of interest to the user, thus enabling the user to more quickly and easily locate a particular item of interest in VFM 220.

In one example, VFM 220 automatically reconfigures the first view filter to reallocate space in VFM 220 to one or more tools or items of interest once a particular tool or item has been collapsed in VFM 220. This implementation allows space in VFM 220 to be efficiently allocated, while simultaneously minimizing the amount of input from a user. Therefore, the reallocation process is streamlined so as to save the user time and energy.

It is therefore understood that various embodiments enable a user to customize a drop-down menu in VFM 220 such that VFM 220 offers an integration of useful features associated with CAD program 210 as well as a level of customization that increases the efficiency with which data is displayed to the user in a GUI.

In one embodiment, VFM 220 is further configured to generate a new configuration of the first view filter in response to the collapsing of a graphical label. This new configuration is then stored such that the first view filter retains the new configuration upon a switch between the first view filter and a second view filter rather than acquiring different configuration characteristics associated with the second view filter. In this manner, a user has the option of using VFM 220 to toggle between various view filters in order to view the same data structure in different ways, but wherein such toggling does not change the configuration characteristics of these view filters.

Automatic Zooming and Updating

In accordance with an embodiment, VFM 220 utilizes an automatic zoom function to automatically adjust a size of a displayed graphical representation, such as graphical display 241, so that the graphical representation is completely displayed within a specific portion of viewing region 240. For instance, in one example, VFM 220 is configured to display a graphical representation within a minimum threshold area in viewing region 240 such that the size of the graphical representation is maximized while every object that comprises the graphical representation is displayed within this threshold area. In addition, in the illustrated embodiment, VFM 220 includes automatic zoom button 354, which a user can click in order to execute the automatic zoom function.

With reference still to FIG. 4, a view filter named "All-Copy" is used to display data in viewing region 240, wherein the displayed data includes a town layout 441. The automatic zoom function in VFM 220 is turned on such that town layout 441 is completely displayed in viewing region 240. The automatic zoom function is "turned on", for example, by clicking automatic zoom button 354. In addition, rather than filling a relatively small portion of viewing region 240, the size of the graphically represented data has been maximized within a minimum threshold area such that the visual attributes of town layout 441 are easier to analyze.

It is therefore understood that, pursuant to one embodiment, the automatic zoom function is configured to completely fill a large area of viewing region 240 with a plurality of graphically represented objects. For instance, town layout 441 comprises a plurality of dwelling structures 442, trees 443 and fire hydrants 444, as well as a network of interconnected roads 445. Thus, execution of the automatic zoom function causes VFM 220 to configure a view filter, such as view filter 230, to display a graphical representation of town layout 441 in viewing region 240 such that the separate objects that together comprise town layout 441 are all displayed in town layout 441. Moreover, the automatic zoom function is configured to zoom in when the graphical representation of the displayed objects is fairly small relative to the available area in viewing region 240, or zoom out when the objects cannot be completely displayed within viewing region 240.

In accordance with an embodiment, an automatic updating function is utilized to update a view filter in response to an acquisition of newly acquired data such that a display configuration of the view filter is automatically altered in response to the acquisition of this new data. The user would then have the option of reconfiguring a view filter such that the view filter responds in a defined manner in response to new data. In one example, the new data is acquired after a creation of a view filter, and the automatic updating function is used to alter a configuration of this view filter in response to this new data.

To further illustrate, in accordance with an embodiment, a view filter is used to display a first set of data in a GUI, such as in viewing region 240. CAD program 210, which implements this view filter, receives a second set of data, such as by importing a file of data from an external data source. In one example, VFM 220 implements a graphical check box called "View New Entities", and checking this checkbox causes a view filter to display both the first and second sets of data in the GUI, whereas leaving this checkbox unchecked would cause the view filter to display the first set of data while excluding the second set of data from view.

In an alternative embodiment, a graphical option called "Include Newly Created Layers" is implemented by VFM 220 so as to allow a user to reconfigure a view filter such that the view filter either includes or excludes newly acquired data layers in viewing region 240. For example, as illustrated in FIG. 4, town layout 441 does not appear to comprise sidewalks or power lines located adjacent to network of interconnected roads 445. However, execution of the automatic updating function will cause VFM 220 to automatically reconfigure a view filter upon importing a sidewalk data layer and a power line data layer such that the graphical display of town layout 441 is automatically updated to include objects from these data layers.

Data Collections

In accordance with an embodiment, VFM 220 is used to implement a selection set function configured to save a group of identified objects as a selection set such that each of the identified objects is automatically selected when any one of the identified objects is selected. With reference still to FIG. 4, in one example, a user utilizes the selection set function to select various graphically represented objects in town layout 441 as a single selection set such that the selection of a single object from this selection set causes the selection set function to automatically select each object associated with the selection set.

To illustrate, in accordance with an example, a graphical representation of a town, which includes a plurality of fire hydrants within its municipal borders, is shown in viewing region 240 as town view 441. Town view 441 comprises a plurality of fire hydrants 444, which includes a first fire hydrant 444a, a second fire hydrant 444b and a third fire hydrant 444c. A user utilizes VFM 220 and the selection set function to group two fire hydrants of interest, such as first fire hydrant 444a and second fire hydrant 444b. The user selects first fire hydrant 444a and second fire hydrant 444b from among the plurality of fire hydrants 444 and saves them as a single selection set. In this manner, clicking on this selection set automatically selects first fire hydrant 444a and second fire hydrant 444b without selecting third fire hydrant 444c.

The aforementioned implementation could be used by a user, for instance, to more easily view and analyze a group of objects that are of interest to the user. In the previous example, the selection set function is used to isolate two fire hydrants of interest from the fire hydrant data layer such that specific objects from the fire hydrant data layer, as well as from town layout 441, are focused upon.

In one embodiment, the selection set function is utilized to save objects from different layers of related data as a selection set. For instance, in one example, town layout 441 further comprises a plurality of dwelling structures 442 and a plurality of trees 443, and a user is interested in a section 452 of town layout 441. This user selects objects located in section 452, wherein various objects from among the selected objects are associated with different layers of data. As shown in the illustrated embodiment, section 452 comprises a single dwelling structure 442a from a dwelling structure data layer, a single tree 443a from a tree data layer, and third fire hydrant 444c, which is from a fire hydrant data layer. The user therefore selects these objects and saves them as a single selection set, even though single dwelling structure 442a, single tree 443a and third fire hydrant 444c are associated with different data layers. In this manner, a user has the option of easily and efficiently analyzing attributes associated with section 452.

Multiple Views

In accordance with an embodiment, VFM 220 is configured to edit a configuration of a view filter so as to display a specific view of a group of selected data. In one example, an "Upper Left" view is selected from a drop-down menu in VFM 220, and VFM 220 edits the view filter used to display this data according to this selection. Consequently, the "Upper Left" view of the graphically represented data is displayed in viewing region 240. It is therefore appreciated that VFM 220 may be configured to offer multiple views of the same collection of data, such as from different perspective angles. It is further understood that this application offers a user member-wise control over the data that is displayed and the data that is excluded from view.

In one embodiment, VFM 220 is used to configure a view filter to restrict the data displayed in viewing region 240 to data associated with a particular data collection belonging to an imported file. In this manner, a graphical view in CAD program 210 is restricted to newly imported data such that a user is presented with the option of viewing and analyzing this data quickly and efficiently. It will be appreciated by those skilled in the art that this implementation offers a powerful tool for analyzing newly imported data, because an alternative would be to import the new data and then attempt to determine which data shown in viewing region 240 is newly imported and which data was previously displayed. Moreover, by analyzing the newly imported data in isolation, a user can more easily review this data and decide if this data is correct, such as during a check in and quality assurance process. The user then has the option of viewing the newly acquired data and the previously obtained data together.

VFM 220 is also utilized, in accordance with an embodiment, to alter a configuration of a view filter such that data is displayed by the edited view filter in a split screen, which is shown in viewing region 240. In one example, this split screen configuration is utilized to simultaneously view the same graphically represented object from different angles.

In an alternative embodiment, a view filter is configured to filter data differently in the different views of the split screen. According to one example, various data layers associated with a graphical representation of a data structure are turned on in one view while being turned off in another view. A user then has the option of analyzing the effects on the represented data structure of both the presence and absence of these layers.

In a further embodiment, a split screen is used to provide a side-by-side comparison of new data with old data. For example, once a new version of a data structure is constructed, this new version is imported into CAD program 210, which is used to analyze this new version. Moreover, VFM 220 configures a view filter to simultaneously display both the new version of the data structure with a previous version of the same structure such that a user is able to easily compare and contrast the two graphical views.

Layer Isolation and Exclusion

Figure 5:
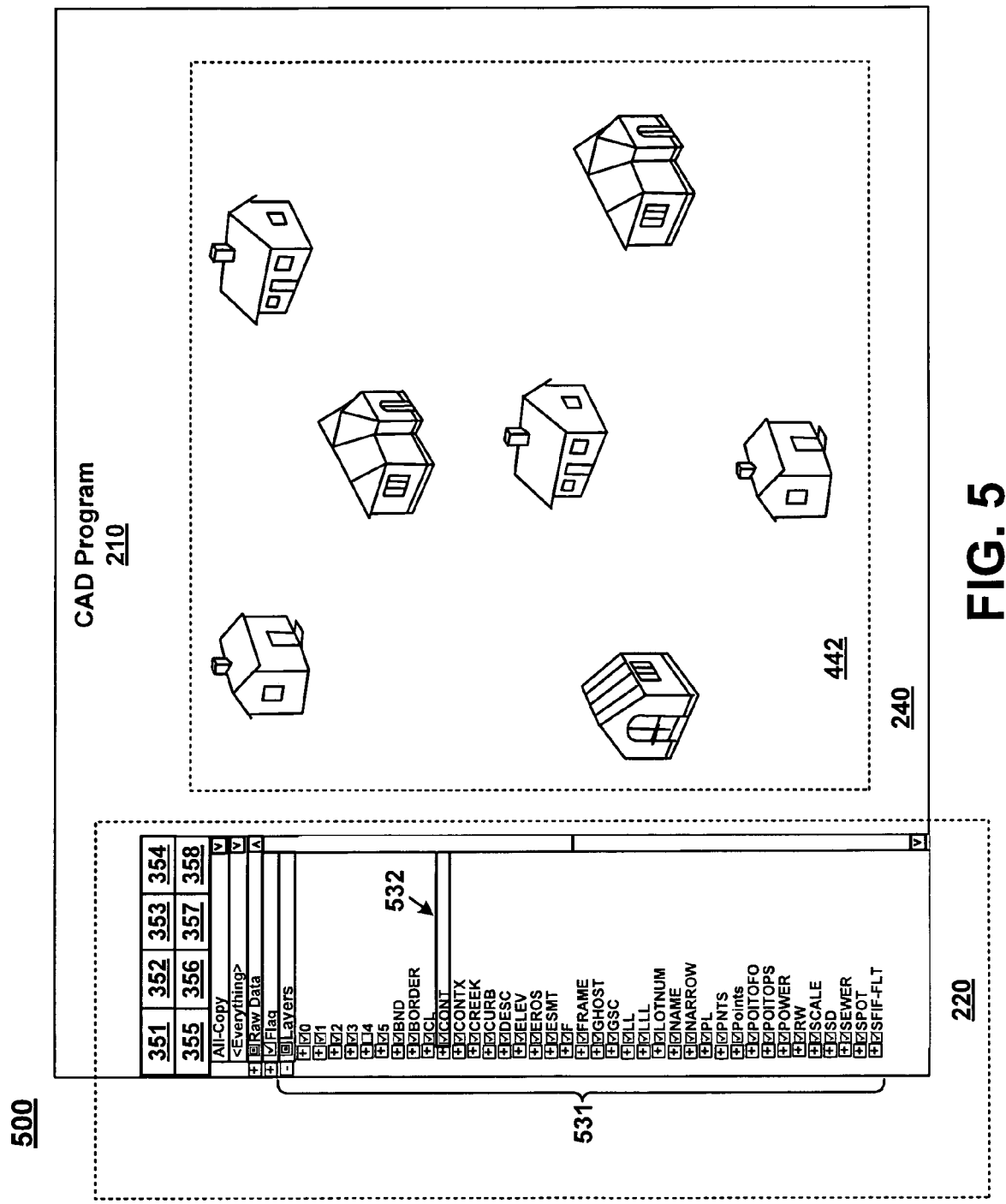
FIG. 5 is a diagram of an exemplary layer isolation configuration used in accordance with an embodiment.

With reference now to FIG. 5, an exemplary layer isolation configuration 500 for isolating layers of related data in CAD program 210 in accordance with an embodiment is shown. CAD program 210 comprises VFM 220, which generates a scrollable listing 531 of multiple layers of data associated with a data structure. A view filter, such as view filter 230, is employed to display a single layer of data from scrollable listing 531 based on a present position 532 within scrollable listing 531.

In one embodiment, the layers of data associated with town view 441 are displayed in scrollable listing 531, as shown in FIG. 5, and a user has the option of scrolling through scrollable listing 531 such that a single layer of data is displayed by a view filter in viewing region 240 based on present position 532 within scrollable listing 531, and wherein the other layers are suppressed from view by the view filter. In the illustrated embodiment, dwelling structures 442 belonging to the dwelling structure layer are displayed in viewing region 240, while other data layers, such as the tree and fire hydrant layers, are hidden from view. It is appreciated that the illustrated embodiment is useful, for instance, as a tool for analyzing the relative proximity of dwelling structures 442 to one another within town layout 441.

In one embodiment, the layer isolate function is configured to flag a selected layer in scrollable listing 531 in response to a layer selection, and store the layer selection while scrollable listing 531 is subsequently scrolled. For instance, a user could scroll through scrollable listing 531 so as to view each layer associated with a data structure in isolation, and graphically flag each layer that is of interest to the user. As shown in FIG. 5, for instance, layers 0-3 have been identified as a layer of interest by checking graphical checkboxes in VFM 220 located next to the graphical labels associated with these layers. In this manner, a user has the option of flagging a layer of interest in scrollable listing 531, and then continuing to scroll through the layers without manually writing down the names of those layers that the user found interesting.

It is therefore understood that an embodiment offers a layer isolation feature that is fully integrated with one or more view filters by means of VFM 220. Such a configuration saves a user from the hassle of leaving a view filter in order to hunt for other operations in CAD program 210 and then returning to the view filter to complete a project. Rather, a view filter is configured to display a plurality of layers of data associated with a data structure when the layer isolate function is not being implemented, but when the layer isolate function is executed, such as by pressing layer isolate button 355 in VFM 220, the view filter is reconfigured so as to display a single layer of data based on present position 532 within scrollable listing 531.

Pursuant to an alternative embodiment, the layer isolate function is configured to store a user selection even after the layer isolate mode has been turned off. In an exemplary scenario, for instance, a user scrolls through the layers listed in scrollable listing 531, such as with a mouse wheel or keyboard arrow button, and graphically flags the layers of interest, such as by means of graphical checkboxes associated with these layers. Next, when the user has finished perusing the layers, the user exits the layer isolate mode. However, the layer isolate function continues to remember which layers were previously flagged while CAD program 210 was in the layer isolate mode. In this manner, a user is presented with the option of toggling in and out of a layer isolate mode without one or more layer selections being lost.

VFM 220 is further configured, pursuant to an embodiment, to edit a view filter based on a layer selection in scrollable listing 531. For instance, a user selects one or more layers in scrollable listing 531 and then toggles out of the layer isolate mode. VFM 220 then edits a configuration of a view filter such that the selected layers are displayed in viewing region 240 of CAD program 210. In this manner, the layers of interest to the user are displayed without the user manually reconfiguring a view filter after these layers of interest have been identified.

In one exemplary embodiment, this fully integrated layer isolate function not only presents a user with the option of not manually recording the names, or identifying labels, of interesting data layers outside of CAD program 210, such as on a sheet of paper, but is further configured to reduce the number of user operations necessary for viewing each of the layers. To further illustrate, instead of accessing a dialog box to turn on one layer while turning off one or more other layers in order to visually analyze the selected data layer, a user can simply scroll through scrollable listing 531 and a view filter would display one layer at a time while the user continued to scroll through scrollable listing 531, such as with a mouse wheel. This implementation translates into less mouse clicks, keyboard strikes, etc., when viewing these layers in isolation, and the interesting layers will have already been selected by the user such that the user is not presented with the dilemma of constantly returning to a separate dialog box in order to turn on the interesting layers. Hence, this integrated function provides an approach to data layer analysis in CAD program 210.

In one embodiment, VFM 220 implements a layer exclude function configured to automatically exclude a layer comprising a selected object from view in CAD program 210. Consider an example where a user selects an object that is visually displayed in viewing region 240 by a view filter, wherein the selected object is associated with a layer of related data. Execution of the layer exclude function causes the view filter to exclude this entire layer of data from view.

To further illustrate, and with reference to FIG. 4, consider a particular example where a user selects a tree from among trees 443 in town layout 441, wherein the selected tree is associated with the tree data layer. Execution of the layer exclude function causes the entire tree data layer to be excluded from the graphical representation displayed in viewing region 240. Town layout 441 then takes on the appearance of the town as it would exist if the town did not have trees 443, as can be seen in FIG. 5. Therefore, in accordance with an embodiment, a user has the option of selecting objects in a GUI, such as by clicking on such objects with a mouse, and then using the layer exclude function to turn off the associated layers of data. It is appreciated that this feature enables users to save time because the users do not divert their attention away from viewing region 240 in order to turn off layers of data.

It is understood, however, that different methods exist for implementing the layer exclude function. In one embodiment, a user selects a displayed object in viewing region 240, such as a tree from among trees 443, and then executes the layer exclude function in order to exclude a layer of data from view. However, in an alternative embodiment, the user first executes the layer exclude function in order to turn on a layer exclude mode. The user can then select an object in viewing region 240, such as a tree from among trees 443, and the layer exclude function will automatically exclude a corresponding layer of data from view, such as the tree data layer.

Therefore, the layer exclude feature offers a simple click-and-exclude feature that can be used to increase program efficiency. For instance, in one implementation, a user turns on the layer exclude mode, such as by clicking layer exclude button 356, and then clicks on objects displayed in viewing region 240 in order to rapidly exclude from view layers of data associated with these selected objects.

Modeless Dialog Module

Graphical modal dialog modules are generally used by CAD programs to query users for information related to such programs. Oftentimes, graphical modal dialog boxes will be displayed in a GUI over a background portion of the CAD program, and the appearance of these boxes will prevent a user's access to data in the background section. Such modal dialog boxes are often used to control the visibility of information in a background section. For instance, a modal dialog box could be used to query a user for information relating to a configuration of a display of data in the background section, and once the user responds to this query and closes the modal dialog box, the background section will be reconfigured accordingly.

In an exemplary implementation, however, a user opens a modal dialog box and then exits the box in order to implement a change. Consequently, the process of implementing changes in a background becomes cumbersome when the user discovers that subsequent changes are to be made, in which case the user re-accesses the modal dialog box. In accordance with this implementation, a relatively large number of keystrokes or mouse clicks are implemented over time in order to make subsequent changes, and a display reconfiguration becomes relatively time-consuming.

Figure 6:
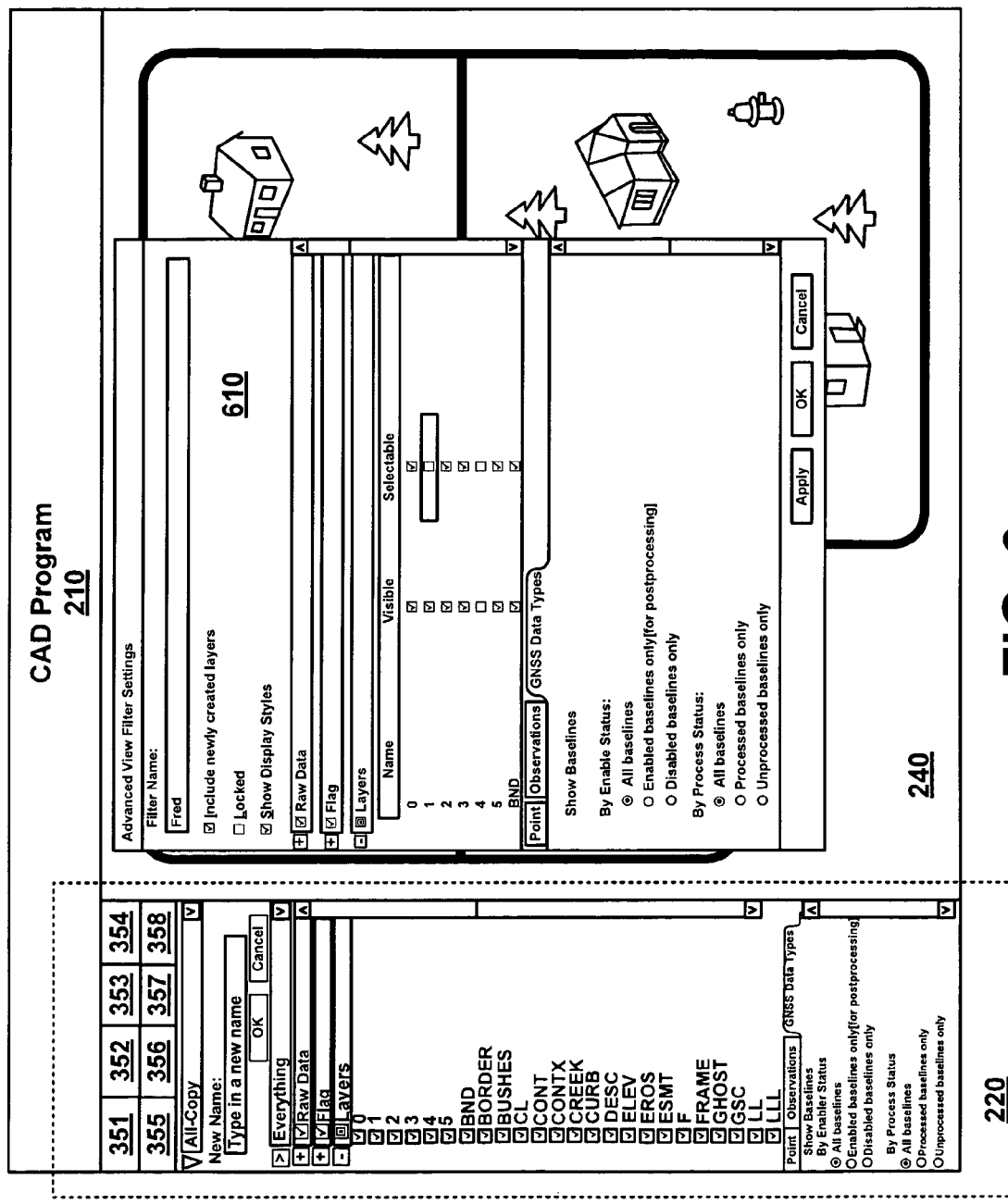
FIG. 6 is a diagram of an exemplary settings configuration used in accordance with an embodiment.

With reference now to FIG. 6, an exemplary settings configuration 600 in accordance with an embodiment is shown. A modeless dialog module 610 is utilized to communicate a query related to CAD program 210 while simultaneously allowing changes to be made to a background display, such as in VFM 220 or viewing region 240, associated with CAD program 210 during the communication of the query. This implementation increases a user's speed and operating efficiency by not limiting a user's actions to choices specified in modeless dialog module 610.

In one example, CAD program 210 generates modeless dialog module 610, and modeless dialog module 610 is displayed to a user in a GUI along with a background portion of CAD program 210. However, while modeless dialog module 610 is displayed in the GUI, the user still has the ability to make changes to CAD program 210, such as in viewing region 240, even though modeless dialog module 610 remains open. Moreover, modeless dialog module 610 is moveable within CAD program 210 such that a user has the option of clicking on modeless dialog module 610 and dragging it to a different portion of a GUI in order to view a different portion of the background display.

It is therefore understood that an embodiment enables a user to make changes in a background portion of a GUI before making any decision in modeless diagram module 610, even though modeless dialog module 610 is displayed to the user in a GUI. In this manner, a user has the option of accomplishing tasks both inside and outside of modeless dialog module 610, as well as determining an order in which tasks are carried out, which provides a greater degree of flexibility regarding the user-friendliness of CAD program 210.

In the exemplary embodiment shown in FIG. 6, modeless dialog module 610 comprises an advanced view filters settings menu, which may be accessed by clicking advanced view filter settings button 357, located in VFM 220. The advanced view filter settings menu allows a user to make changes to a configuration of a view filter, wherein these changes are implemented by VFM 220. For instance, modeless dialog module 610 includes a graphical option called "Include Newly Created Layers", which is configured to allow a user to reconfigure a view filter such that the view filter either includes or excludes newly acquired data layers in viewing region 240. In the illustrated embodiment, this feature is generally hidden from view, in order to save space in VFM 220. However, clicking advanced view filter settings button 357 provides a user with access to the "Include Newly Created Layers" option, while simultaneously allowing a user to make changes to a background portion of CAD program 210.

With reference still to FIG. 6, modeless dialog module 610 is integrated with VFM 220 such that VFM 220 edits a view filter to make changes to a background section, such as viewing region 240, of a GUI when modeless dialog module 610 is displayed. In one embodiment, VFM 220 is utilized to configure a view filter to constantly update a view of the background section such that computations associated with the requested changes are not experienced by CAD program 210 all at once. This enables CAD program 210 to implement changes more quickly and efficiently, because the computations are carried out over a longer time span. Furthermore, a user is provided with the option of quickly reviewing an implemented change to determine if the user wishes to undo or reconfigure the change.

It is therefore understood that using modeless dialog module 610, pursuant to an embodiment, enables a user to make changes in a background section of CAD program 210 while modeless dialog module 610 is still open in a GUI. Moreover, in one embodiment, modeless dialog module 610 is integrated with VFM 220 such that VFM 220 configures a view filter to monitor for the occurrence of specific events that have an effect on data displayed or filtered by the view filter. When an event occurs that affects this data, the view filter would analyze the changes that have been made and update an appearance of a GUI in accordance with these changes.

View Filter Protection

It should be appreciated by those skilled in the art that the process of creating and configuring a view filter according to a specific viewing criterion, such as when a represented data structure consists of hundreds of layers of data, may be a fairly time consuming process. After a user has invested a substantial amount of time in customizing a view filter, the user may wish to protect the view filter such that it cannot be altered. This would help ensure that the user's work is not lost due to an accidental modification of the view filter, such as can occur, for example, when a user accidentally enters an unintentional keystroke, or if the user temporarily leaves a computer terminal and a third party inadvertently makes changes to the view filter while not realizing that the view filter is being altered.

An embodiment offers a safety function that is utilized to lock a view filter such that it cannot be accidentally changed. For instance, in one example, this function is implemented so as to cause a user to think twice about modifying a view filter that the user created so that the user's work is not inadvertently lost. In particular, VFM 220 is integrated with a locking function, which is executed in response to a locking input received from a user, such as when the user clicks VF locking button 358 in VFM 220. When the locking function is executed, a selected view filter becomes unalterable during an operation of the view filter. In one embodiment, the locking function further comprises an unlocking feature which unlocks a locked view filter in response to receiving an unlocking input such that the view filter is alterable during an operation of the view filter. Therefore, a user has the option of locking and unlocking a view filter depending on, for example, the user's willingness to make changes to the view filter or otherwise protect the view filter from alteration.

In an alternative embodiment, the locking function is configured to store a configuration of a view filter such that the view filter may be accessed and utilized at a future time. For instance, in one example, execution of the locking function causes VFM 220 to save a configuration of a view filter into system memory, even when the view filter is still in use. This configuration is then accessible to a user at a future point in time such that new changes to the view filter do not effect the saved configuration. It is therefore understood that the locking function may be implemented such that a configuration of a view filter is protected when in use and/or when stored for future use.

Exemplary Methods of Operation

The above discussion has set forth the operation of some example systems, devices, and methods of operation of embodiments described herein. With reference to FIGS. 1-6, exemplary systems and methods of implementation used by various embodiments have been illustrated and described. It is understood that, in various embodiments, one or more steps of a method of implementation are carried out by a processor under the control of computer-readable and computer-executable instructions. Thus, in some embodiments, these methods are implemented via a computer, such as computer system 100 of FIG. 1. The computer-readable and computer-executable instructions reside, for example, in data storage features such as computer usable/readable volatile memory 104, computer usable/readable non-volatile memory 106, or computer useable/readable storage device 118 of computer system 100 (all shown in FIG. 1). The computer-readable and computer-executable instructions, which may reside on computer useable/readable media, are used to control or operate in conjunction with, for example, processor 102 of FIG. 1.

Therefore, one or more operations of various embodiments may be controlled or implemented using computer-executable instructions, such as program modules, being executed by a computer. Generally, program modules include routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote computer-storage media including memory-storage devices.

With reference now to FIG. 7, an exemplary method 700 of configuring a graphical display of a CAD program in accordance with an embodiment is shown, wherein the CAD program comprises first and second view filters. Method 700 comprises utilizing a view filter to display a graphical label in a portion of a graphical display of a CAD program 710, and collapsing the graphical label in response to a selection such that the graphical label occupies less space in the graphical display 720. Method 700 further comprises generating a new configuration of the view filter in response to the collapsing 730.

To illustrate, consider a particular example where a graphical label is shown in a graphical display by a view filter, and this graphical label is infrequently or never used by a user. The graphical label is collapsed by reconfiguring a view filter such that the graphical label occupies less space in the graphical display, and such that an area in the graphical display that had previously been utilized by the graphical label is subsequently available to display other data to a user.

It is understood, however, that method 700 is capable of being expanded so as to incorporate further embodiments. In one embodiment, a second graphical label is displayed in the portion of the graphical display that was previously occupied by the collapsed graphical label. Thus, pursuant to an example, a first graphical label is collapsed from view such that the collapsing of this first graphical label creates a newly available portion in the graphical display. Furthermore, a second graphical label is displayed, such as by the reconfigured view filter, in this newly available portion in response to the collapsing of the first graphical label. Thus, it is appreciated that an embodiment provides a method of automatic data updating in a GUI in response to the collapsing of a first set of data from a graphical display.

Method 700 further comprises, in accordance with an embodiment, utilizing a set of graphically represented tabs to communicate which data layers from among a plurality of data layers are presently displayed in the GUI. Consider the example where a set of graphically represented tabs are located adjacent to, or in close proximity to, a particular graphical display in a GUI, wherein these tabs are labeled so as to graphically communicate which data layers are displayed in the graphical display. Selecting a graphical tab causes a separate graphical label corresponding to the same data layer as the graphical tab to be collapsed from view in the GUI. Indeed, in one example, selection of the graphical tab also causes the data layer corresponding to this tab to be hidden from view by reconfiguring a view filter in accordance with the selection.

It is further understood that, pursuant to an embodiment, method 700 further comprises implementing a locking function configured to prevent a new configuration of the reconfigured view filter from being altered during an operation of the view filter in response to a locking input. For instance, in one example, a view filter is reconfigured in view of the collapsing of a graphical label, and a user communicates a desire to lock the new configuration of this view filter such that the new configuration is rendered unalterable. Once the new configuration has been locked, the view filter is protected such that a requested modification of the view filter, whether intentional or accidental, is not implemented.

In an alternative embodiment, a CAD program comprises first and second view filters having different configuration characteristics. Method 700 further comprises storing a configuration of the first view filter such that the first view filter retains the new configuration upon a switch between the first view filter and the second view filter rather than acquiring different configuration characteristics associated with the second view filter. Consider the example where a first view filter is used to display a graphical label in a graphical display. The graphical label is collapsed in response to a selection such that the graphical label occupies less space in the graphical display, and a new configuration of the first view filter is generated accordingly. This new configuration is stored in a system memory, and a second view filter is accessed wherein the second view filter displays data in the graphical display pursuant to a different display configuration. However, when the stored configuration of the first view filter is subsequently accessed, this configuration is re-implemented such that a user is presented with the option of reusing the first view filter without reconfiguring the first view filter according to the display characteristics of the stored configuration.

With reference now to FIG. 8, an exemplary method 800 of filtering data related to a graphical representation displayed in a GUI by a view filter in accordance with an embodiment is shown. Method 800 comprises providing a scrollable listing of multiple layers of related data associated with a graphical representation displayed in a GUI by a view filter 810. Method 800 further comprises receiving a layer selection during a scrolling of the scrollable listing, wherein the layer selection identifies a layer of related data from among the multiple layers of related data 820, storing the layer selection while the scrolling of the scrollable listing is continued 830, and editing the view filter based on the layer selection 840.

It is understood, however, that method 800 is capable of being expanded so as to incorporate further embodiments. In one embodiment, method 800 further comprises displaying a single layer of related data from among the multiple layers of related data based on a present position in the scrollable listing. For instance, in one example, the scrollable listing comprises a number of graphical labels that correspond to the multiple layers of related data. Moreover, a user scrolls through the scrollable listing to view each of the data layers in isolation depending on which of the graphical labels is highlighted, or otherwise identified as representing a present position in the scrollable listing.

Indeed, one exemplary embodiment comprises flagging a layer in the scrollable listing based on the layer selection while the scrolling of the scrollable listing is continued. For instance, one or more data layers of interest to a user are flagged in a GUI while the user continues to scroll through the scrollable listing of data layers and view the data layers in isolation. In this manner, a first data layer remains flagged while the user simultaneously views a second data layer in a graphical display, but the graphical display does not show the flagged data layer when the second data layer is in view.

Method 800 further comprises, in accordance with an embodiment, enabling a selection of multiple objects associated with the graphical representation, and creating a selection set in response to the selection of the multiple objects. The selection set comprises the multiple objects such that each of the multiple objects is selected when any one of the multiple objects is selected. To illustrate, a user is provided with the option of selecting different objects in a graphical display and saving these objects as a single selection set such that the user can simultaneously select the members of this selection set without taking the time to select each member individually. Furthermore, it is understood that pursuant to an exemplary embodiment, multiple objects comprise a selection set and each of these objects is associated with a different data layer. In an alternative embodiment, method 800 is expanded to further comprise automatically excluding from the graphical representation a layer comprising a selected object.

It is further appreciated that method 800 may be further expanded so as to include implementing multiple views of displayed data. For instance, in an embodiment, method 800 further comprises utilizing the view filter to simultaneously display a first view and a second view of the graphical representation in a GUI such that the graphical representation is displayed differently in the first view and the second view. In one example, a view filter is configured to display data in a split screen configuration wherein the combination of the first view and the second view in a GUI comprises a graphical representation of the split screen configuration, and wherein the first view is located adjacent to the second view.

In one embodiment, method 800 further comprises storing a configuration of a view filter upon closing of the view filter such that the configuration may be subsequently accessed. In this manner, a user is provided with the option of accessing the stored configuration and reusing the view filter pursuant to this configuration without manually regenerating the configuration. It is therefore understood that a configuration of a view filter is saved, in accordance with an embodiment, into a system memory, and a second view filter is subsequently utilized while the configuration of the first view filter continues to be saved. Thus, the configuration of the view filter is protected when the view filter is not in use.

However, it is appreciated that the spirit and scope of the present technology is not limited to the aforementioned embodiment of view filter protection. With reference now to FIG. 9, an exemplary method 900 of configuring a CAD program in accordance with an embodiment is shown. Method 900 comprises enabling a user-defined view filter to be created, wherein the user-defined view filter is configured to display information in a CAD program 910, and implementing a locking function in response to receiving a locking input, wherein the locking function is configured to lock the user-defined view filter such that the user-defined view filter is unalterable during an operation of the user-defined view filter 920. Therefore, in one example, a view filter is locked, based on a locking input received from a user, and the user continues to utilize the view filter to display data associated with the CAD program without a configuration of the view filter being altered by an unintentional keystroke or mouse click.

In one embodiment, method 900 further comprises unlocking the user-defined view filter in response to receiving an unlocking input such that the user-defined view filter is alterable during an operation of the user-defined view filter. For instance, a view filter is first locked by a user, and the user subsequently unlocks the locked view filter such that a configuration of the view filter is rendered alterable. In this manner, a user has the option of locking a view filter to protect it from alteration, and subsequently unlocking a locked view filter when changes are desired.

It is also appreciated that a locked configuration may be stored for future use. For instance, in one embodiment, method 900 further comprises storing the user-defined view filter such that the user-defined view filter may be accessed and utilized at a future time. Therefore, it is understood that pursuant to an embodiment, a view filter may be protected from alterations both when in use and when not in use.

Although specific steps of exemplary methods of implementation are disclosed herein, it is understood that these steps are examples of steps that may be performed in accordance with various exemplary embodiments. That is, embodiments are well suited to performing various other steps or variations of the steps recited. It is further appreciated that the steps disclosed herein may be performed in an order different than presented, and that not all of the steps are necessarily performed in a particular embodiment.

Although various electronic and software based systems are discussed herein, it is understood that these systems are merely examples of environments that might be utilized, and are not intended to suggest any limitation as to the scope of use or functionality of the present technology. Neither should such systems be interpreted as having any dependency or relation to any one or combination of components or functions illustrated in the disclosed examples.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A view filter manager (VFM) associated with configuring Computer Aided Design (CAD) program, said VFM comprising:
   a scrollable listing of a plurality of layers of related data to be displayed on a computer-implemented graphical representation;
   a layer isolate function configured to flag a selected layer in said scrollable listing in response to a layer selection, and store said layer selection while said scrollable listing is subsequently scrolled;
   a view filter configured to display a computer-implemented graphical representation comprising every stored layer selection;
   a locking function configured to lock said view filter by preventing removal or addition of any of said plurality of layers of related data from said stored layer selection during an operation of said view filter;
   a creating function configured to automatically create an editable copy of said view filter when an attempt is made to edit said view filter when said view filter is locked by said locking function such that modifying said editable copy of said view filter does not modify said view filter, and
   an automatic updating function configured to update said view filter in response to an acquisition of new data to be displayed by said view filter in said display such that a display configuration of said view filter is altered in response to said new data wherein the acquisition of new data is based on toggling on an user input control in a settings interface.

2. The VFM of claim 1 wherein said view filter is further configured to display a single layer from among said plurality of layers based on a present position in said scrollable listing.

3. The VFM of claim 1 wherein said VFM is configured to edit said view filter based on said layer selection.

4. The VFM of claim 1, further comprising:
   a graphical modeless dialog module configured to communicate a query related to a CAD program while simultaneously allowing changes to be made to said display during said communication of said query.

5. The VFM of claim 1, further comprising:
   a layer exclude function configured to automatically exclude from said display a layer comprising a selected object.

6. The VFM of claim 1, further comprising: an automatic zoom function configured to adjust a size in said display of a graphical representation of a layer from among said plurality of layers such that said layer is completely displayed within a portion of said display comprising a minimum threshold area.

7. The VFM of claim 1, further comprising: an automatic updating function configured to update said view filter in response to an acquisition of new data to be displayed by said view filter in said display such that a display configuration of said view filter is altered in response to said new data.

8. A method of configuring a computer aided design (CAD) program, said method comprising:
   enabling a user-defined view filter to be created, said user-defined view filter being configured to select one or more layers of related data to be displayed and to display information in said CAD program;
   implementing a locking function in response to receiving a locking input, said locking function configured to lock said user-defined view filter with respect to said one or more layers of related data previously selected to be displayed such that the layers of related data displayed by said user-defined view filter is unalterable during an operation of said user-defined view filter;
   automatically creating an editable copy of said user-defined view filter when an attempt is made to edit said user-defined view filter when said user-defined view filter is locked by said locking function~such that modifying said editable copy of said user-defined view filter does not modify said user-defined view filter, and
   implementing a selection set function configured to save a plurality of identified objects as a selection set such that each of said plurality of identified objects is automatically selected when any one of said plurality of identified objects is selected.

9. The method of claim 8, further comprising:
   storing said user-defined view filter such that said user-defined view filter may be accessed and utilized at a future time.

10. The method of claim 8, further comprising: unlocking said user-defined view filter in response to receiving an unlocking input such that said user-defined view filter is alterable during an operation of said user-defined view filter.

11. A method of filtering data related to a graphical representation displayed in a graphical user interface (GUI) by a view filter, said method comprising:
    providing a scrollable listing of a plurality of layers of related data associated with said graphical representation;

receiving a layer selection during a scrolling of said scrollable listing, said layer selection identifying one or more layers of related data from among said plurality of layers;

storing said layer selection while said scrolling of said scrollable listing is continued;

editing said view filter based on said layer selection, such that said view filter displays a computer-implemented graphical representation comprising every stored layer selection;

utilizing a locking function to lock said view filter by preventing removal or addition of any of said plurality of layers of related data from said stored layer selection during an operation of said view filter;

automatically creating an editable copy of said view filter when an attempt is made to edit said view filter when said view filter is locked by said locking function~such that modifying said editable copy of said view filter does not modify said view filter, enabling a selection of a plurality of objects associated with said graphical representation; and creating a selection set in response to said selection of said plurality of objects, said selection set comprising said plurality of objects such that each of said plurality of objects is selected when any one of said plurality of objects is selected.

12. The method of claim 11, further comprising:
displaying a single layer of related data from among said plurality of layers based on a present position in said scrollable listing.

13. The method of claim 11, further comprising:
flagging said layer in said scrollable listing based on said layer selection while said scrolling of said scrollable listing is continued.

14. The method of claim 11 wherein said creating a selection set in response to said selection of said plurality of objects comprises:
creating a selection set in response to said selection of said plurality of objects, wherein each object from among said plurality of objects is associated with a different layer from among said plurality of layers.

15. The method of claim 11, further comprising:
automatically excluding from said graphical representation a layer comprising a selected object.

16. The method of claim 11, further comprising: utilizing said view filter to simultaneously display a first view and a second view of said graphical representation in said GUI such that said graphical representation is displayed differently in said first view and said second view.

17. The method of claim 11, further comprising:
storing a configuration of said view filter upon closing of said view filter such that said configuration may be subsequently accessed.

* * * * *